(12) United States Patent
Adkins et al.

(10) Patent No.: US 6,320,012 B1
(45) Date of Patent: Nov. 20, 2001

(54) ISOCYANATE FORMULATIONS CONTAINING ACTIVATED CHAIN EXTENDERS

(75) Inventors: Rick L. Adkins, New Martinsville; William E. Slack, Moundsville, both of WV (US); Edward P. Squiller, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/451,967

(22) Filed: Nov. 30, 1999

(51) Int. Cl.$^7$ .................................................. C08G 59/50
(52) U.S. Cl. ...................... 528/85; 252/182.22; 560/26; 560/132
(58) Field of Search ...................... 528/85; 252/182.22; 560/26, 132

(56) References Cited

U.S. PATENT DOCUMENTS

| | | | |
|---|---|---|---|
| 4,026,840 | * | 5/1977 | Bechara . |
| 4,239,878 | * | 12/1980 | Kobayashi et al. ..................... 528/45 |
| 5,104,907 | * | 4/1992 | Yoshimura et al. ................. 521/128 |

* cited by examiner

*Primary Examiner*—Rachel Gorr
(74) *Attorney, Agent, or Firm*—Joseph C. Gil; Lyndanne M. Whalen

(57) ABSTRACT

The reactivity of isocyanate formulations is controlled by including a chain extender corresponding to the formula $$\text{HO}-\text{R}^1-\text{NR}^2-\text{X}-\text{NR}^3-\text{R}^4-\text{OH} \quad \text{(I)}$$

in which $R^1$, $R^2$, X, $R^3$ and $R^4$ represent specified groups is included in the isocyanate formulation.

6 Claims, No Drawings

ISOCYANATE FORMULATIONS CONTAINING ACTIVATED CHAIN EXTENDERS

BACKGROUND OF THE INVENTION

The present invention relates to a process for controlling the reactivity of isocyanate formulations by selection of a chain extender having the desired effect upon isocyanate reactivity and to a process for producing relatively stable isocyanate formulations containing activated chain extenders.

The use of isocyanate formulations to produce urethanes for a wide variety of applications is known. One of the additives that is frequently included in such isocyanate formulations is a chain extender.

The most commonly used chain extenders are diols and primary amines. However, processing difficulties are encountered with each of these types of chain extenders. Diol chain extenders react so slowly with an isocyanate that, in the absence of a catalyst, the time required to complete the reaction is commercially impractical. Primary amines, on the other hand, react much too quickly with isocyanates.

It would therefore be desirable to develop a chain extender having an isocyanate reactivity greater than that of diols but less than that of primary amines.

SUMMARY OF THE INVENTION

It is an object of the present invention to provide a relatively stable isocyanate formulation.

It is another object of the present invention to provide a method for adjusting the reactivity of an isocyanate formulation by selecting an appropriate activated chain extender.

These and other objects of the invention which will be apparent to those skilled in the art are accomplished by including an activated chain extender corresponding to Formula (I) specified herein in an isocyanate formulation.

DETAILED DESCRIPTION OF THE INVENTION

The present invention is directed to isocyanate formulations in which an activated chain extender corresponding to the formula $$HO-R^1-NR^2-X-NR^3-R^4-OH \quad (I)$$

in which $R^1$ represents an alkyl group having from 2 to 8 carbon atoms, preferably from 2 to 6 carbon atoms, most preferably from 2 to 4 carbon atoms, $R^2$ represents an alkyl group having from 1 to 8 carbon atoms, preferably from 1 to 6 carbon atoms, most preferably from 1 to 4 carbon atoms, an aryl group having from 6 to 14 carbon atoms, preferably from 6 to 10 carbon atoms, most preferably from 6 to 8 carbon atoms, or a hydroxyalkyl group having from 2 to 8 carbon atoms, preferably from 2 to 6 carbon atoms, most preferably from 2 to 4 carbon atoms and from 1 to 2 hydroxyl groups, preferably 1 hydroxyl group, $R^3$ represents an alkyl group having from 1 to 8 carbon atoms, preferably from 1 to 6 carbon atoms, most preferably from 1 to 4 carbon atoms, an aryl group having from 6 to 14 carbon atoms, preferably from 6 to 10 carbon atoms, most preferably from 6 to 8 carbon atoms, or a hydroxyalkyl group having from 2 to 8 carbon atoms, preferably from 2 to 6 carbon atoms, most preferably from 2 to 4 carbon atoms and from 1 to 2 hydroxyl groups, preferably 1 hydroxyl group, $R^4$ represents an alkyl group having from 2 to 8 carbon atoms, and X represents an alkyl group having from 1 to 16 carbon atoms, preferably from 2 to 14 carbon atoms, most preferably from 3 to 12 carbon atoms, an aryl group having from 6 to 14 carbon atoms, preferably from 6 to 10 carbon atoms, most preferably from 6 to 8 carbon atoms, or a polyether represented by the formula $$-(R^5OR^6)_n-$$

in which $R^5$ represents an alkyl group having from 1 to 6 carbon atoms, preferably from 1 to 5 carbon atoms, most preferably from 1 to 4 carbon atoms or an aryl group having from 6 to 10 carbon atoms, preferably from 6 to 9 carbon atoms, most preferably from 6 to 8 carbon atoms, and $R^6$ represents an alkyl group having from 1 to 6 carbon atoms, preferably from 1 to 5 carbon atoms, most preferably from 1 to 4 carbon atoms or an aryl group having from 6 to 10 carbon atoms, preferably from 6 to 9 carbon atoms, most preferably from 6 to 8 carbon atoms, and n=1–6, preferably 1–5, most preferably 1–3, is incorporated.

Specific compounds represented by Formula (I) which are particularly useful in the practice of the present invention include: 2,2'-[1,4-cyclohexyl bis-[methylene (methylimino)]] bis-ethanol; 2,2'-[1,4-cyclohexyl bis-[methylene (methylimino)]] bis-ethanol; 2,2'-[hexamethylene bis-(methylimino)] diethanol; 2,2'-[hexamethylene bis-(ethylimino)] diethanol; and 3,1 2-diethyl-6,9-dioxa-3, 1 2-diazatetradecane-1, 14-diol.

The chain extenders represented by Formula (I) may be prepared by reacting an excess of aminoalcohol with an alcohol or a polyether having a good leaving group such as a mesylate or halide leaving group. Examples of these chain extenders and a process for producing these chain extenders are disclosed in U.S. Pat. No. 5,326,829 which is incorporated herein by reference.

The aminoalcohol used to produce the chain extender corresponding to Formula (I) may be any of the known aminoalcohols. Preferred aminoalcohols are the N-alkylaminoalcohols, N-arylamino-alcohols and dialcohol amines. Examples of suitable aminoalcohols include: 2-(methylamino)ethanol, 2-(ethylamino)ethanol, diethanol amine, diisopropanolamine, N-phenylethanolamine, 2-(tertbutylamino) ethanol, N-butyl-ethanolamine and N-propyl-ethanolamine. Particularly preferred aminoalcohols are 2-(methylamino)ethanol and 2-(ethylamino) ethanol.

The alcohol used to produce the chain extender of the present invention may be any of the known alcohols which contains a good leaving group. As used herein, a good leaving group is a group which can be displaced at the carbon atom by a nucleophile such as nitrogen, oxygen or sulfur. Examples of good leaving groups include: halide groups, alkyl sulfonate groups, aryl sulfonate groups, and nitrophenoxy groups. Halide groups, particularly chloride and bromide, alkyl sulfonate groups, and aryl sulfonate groups are preferred.

In preparing the alcohol with good leaving groups used to produce the chain extenders of the present invention, the alcohol and reactant supplying the leaving group are generally combined at a low temperature (e.g., 0° C.) and maintained at a temperature below 45°, preferably at a temperature below 35° C.

The aminoalcohol and the alcohol containing good leaving groups are generally reacted in quantities such that at least 1 equivalent of aminoalcohol is present for each equivalent of alcohol containing good leaving groups, preferably from about 1 to about 3 equivalents of aminoalcohol are present for each equivalent of alcohol containing good leaving groups. This reaction is generally conducted at temperatures of from 50 to 200° C., most preferably at a temperature of from 80 to 150° C.

The isocyanate formulation into which the activated chain extender corresponding to Formula (I) is incorporated may be any of the known diisocyanates or polyisocyanates. The isocyanate formulation may be made up of a single isocyanate, a combination of isocyanates, an isocyanate-terminated prepolymer, a modified isocyanate (e.g., allophanates, biurets, carbodiimides and trimers) or an isocyanate adduct having terminal isocyanate groups. The diisocyanates and polyisocyanates are particularly useful. Examples of isocyanates useful in the practice of the present invention include: any of the isomers of toluene diisocyanate and mixtures thereof ("TDI"); any of the isomers of diphenylmethane diisocyanate and mixtures thereof ("MDI"); polyphenylene polymethylene polyisocyanate ("polymeric MDI" or "PMDI"); hexamethylene diisocyanate ("HDI"); isophorone diisocyanate ("IPDI"); and dicyclohexylmethane 4,4'-diisocyanate. TDI, HDI and MDI are particularly preferred.

In the practice of the present invention, the activated chain extender is included in the isocyanate formulation in an amount of from about 0.1 to about 1.5 equivalents for each equivalent of isocyanate, preferably from about 0.5 to about 1.2, most preferably from about 0.8 to about 1.1.

Generally, the activated chain extender will be added to the isocyanate and the resultant mixture will be agitated to ensure dispersion of the chain extender throughout the formulation. The temperature is generally maintained between 25 and 100° C., preferably between 40 and 80° C. during this agitation. The resultant isocyanate formulation is then generally maintained at a temperature of from about 30 to about 90° C., preferably from about 40 to about 80° C. until it is to be used.

The particular activated chain extender used in a given isocyanate formulation should be selected on the basis of the chain extender's reactivity toward the specific isocyanate and on the basis of the desired rate of reactivity. As a general rule, the more steric hindrance present in the chain extender, the lower that chain extender's reactivity towards isocyanates.

The chain extender's reactivity toward a specific isocyanate and the rate of reactivity between these materials may be readily determined by a simple preliminary test. In this test, small amounts of isocyanate and chain extender are combined and the viscosity of the isocyanate is measured until the desired viscosity level is obtained. Generally, however, the activated chain extenders of the present invention do not react sufficiently with an isocyanate to cause the viscosity of that isocyanate to increase to 2,000 mPa·s (at 25° C.) for at least 4 seconds, preferably for at least about 40 seconds, most preferably about 5 minutes.

The isocyanate formulations produced in accordance with the present invention may be used to produce polyurethane foams, elastomers or films in accordance with techniques known to those in the art.

Having thus described our invention, the following Examples are given as being illustrative thereof. All parts and percentages given in these Examples are parts by weight and percentages by weight, unless otherwise indicated.

EXAMPLES

EXAMPLE 1

Activated chain extenders within the scope of the present invention were produced in accordance with the procedure described below. More specifically, 3 mols of the aminoalcohol listed in Table 1 were reacted with 1 equivalent of the alcohol chloride indicated in Table 1 by combining those materials, heating them for 2 hours at 140° C., cooling the mixture, neutralizing the mixture with 50% sodium hydroxide, stripping off excess starting material and water and recovering the desired chain extender by filtering.

TABLE 1

| EXTENDER | ALCOHOL | AMINOALCOHOL |
| --- | --- | --- |
| A | 1,14-cyclohexane-dimethanol | 2-(methylamino)ethanol |
| B | 1,4-cyclohexane dimethanol | 2-(ethylamino)ethanol |
| C | 1,6-hexanediol | 2-(methylamino)ethanol |
| D | 1,6-hexanediol | 2-(ethylamino)ethanol |
| E | triethylene glycol | 2-(methylamino)ethanol |

EXAMPLES 2–11

One equivalent of the chain extender indicated in Table 2 was combined with one equivalent of the isocyanate indicated in Table 2 at 25° C. and the amount of time necessary for the viscosity of the mixture to increase to 2,000 mPa·s ("reaction time") was measured. The reaction time measured is reported in Table 2.

TABLE 2

| Example | Chain Extender | Isocyanate | Reaction Time |
| --- | --- | --- | --- |
| 2* | 1,4-butane diol | HDI[1] | >24 hours |
| 3 | A | HDI[1] | 14.0 minutes |
| 4 | B | HDI[1] | 30.0 minutes |
| 5 | C | HDI[1] | 7.2 minutes |
| 6 | D | HDI[1] | 13.3 minutes |
| 7 | E | HDI[1] | 9.5 minutes |
| 8* | 2-methyl-1,5-pentane diamine[2] | HDI[1] | <1 second |
| 9* | 1,4-butane diol | TDI[3] | 40 seconds |
| 10 | B | TDI[3] | 14 seconds |
| 11 | E | TDI[3] | 4 seconds |

*Comparative Example
[1]HDI available from Bayer Corporation under the name Desmodur N3300.
[2]Chain extender available from DuPont under the name Dytek A.
[3]TDI available from Bayer Corporation under the name Mondur TD-80.

Examples 2, 8 and 9 clearly demonstrate that primary amines have an undesirably high reactivity and butanediol has such a low reactivity that it may not be commercially advantageous to use it as a chain extender in commercial systems without adding a catalyst.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A stable isocyanate formulation comprising
   a) a diisocyanate or polyisocyanate and b) a chain extender comprising 2,2'-[1,4-cyclohexyl bis-[methylene(methylimino)]] bis ethanol.

2. A stable isocyanate formulation comprising
a) a diisocyanate or polyisocyanate and
b) a chain extender comprising 2,2'-[1,4-cyclohexyl bis-[methylene(ethylimino)]] bis ethanol.

3. A stable isocyanate formulation comprising
a) a diisocyanate or polyisocyanate and
b) a chain extender comprising 2,2'-[hexamethylene bis-(methylimino)] diethanol.

4. A stable isocyanate formulation comprising
a) a diisocyanate or polyisocyanate and
b) a chain extender comprising 2,2'-[hexamethylene bis-(ethylimino)] diethanol.

5. A stable isocyanate formulation comprising
a) a diisocyanate or polyisocyanate and
b) a chain extender comprising 3,12-diethyl-6,9-dioxa-3,12-diazatetradecane-1,14-diol.

6. The stable isocyanate formulation of claim 2 in which the isocyanate is selected from the group consisting of hexamethylene diisocyanate, toluene diisocyanate, diphenyl methane diisocyanate, isophorone diisocyanate and dicyclohexylmethane 4,4'-diisocyanate.

* * * * *